US008453617B1

(12) United States Patent  
Olson (10) Patent No.: US 8,453,617 B1
(45) Date of Patent: Jun. 4, 2013

(54) METHOD AND DEVICE FOR CONTROLLING AIR-FUEL INTAKE OF AN INTERNAL COMBUSTION ENGINE

(76) Inventor: Brett T. Olson, Sacramento, CA (US)

(\*) Notice: Subject to any disclaimer, the term of this patent is extended or adjusted under 35 U.S.C. 154(b) by 257 days.

(21) Appl. No.: 12/807,891

(22) Filed: Sep. 16, 2010

(51) Int. Cl.
*F02D 9/00* (2006.01)

(52) U.S. Cl.
CPC .................................. *F02D 9/00* (2013.01)
USPC ...... 123/184.46; 123/359; 123/403; 123/590; 138/39

(58) Field of Classification Search
USPC .. 123/339.1, 339.13, 389, 391, 590; 111/176; 454/333
See application file for complete search history.

(56) References Cited

U.S. PATENT DOCUMENTS

| | | | | |
|---|---|---|---|---|
| 2,930,886 | A * | 3/1960 | Lennan | 362/21 |
| 3,045,687 | A * | 7/1962 | Cramer | 137/56 |
| 3,304,068 | A * | 2/1967 | Thomas | 261/41.5 |
| 3,437,467 | A * | 4/1969 | Floyd | 48/189.3 |
| 3,629,793 | A * | 12/1971 | Ettischer et al. | 439/144 |
| RE27,378 | E | 5/1972 | Lohn | |
| 3,678,962 | A | 7/1972 | Pierce, Jr. | |
| 4,215,663 | A * | 8/1980 | Gaylord | 48/189.4 |
| 4,274,386 | A * | 6/1981 | Reyes | 123/591 |
| 4,596,215 | A | 6/1986 | Palesotti | |
| 4,784,099 | A | 11/1988 | Noe | |
| 5,051,935 | A | 9/1991 | Matty | |
| 5,235,948 | A | 8/1993 | Grant | |
| 5,501,192 | A * | 3/1996 | Cutler | 123/336 |
| 5,525,145 | A * | 6/1996 | Hodge | 96/17 |
| 5,619,960 | A | 4/1997 | Funk | |
| 5,642,712 | A | 7/1997 | Biondo | |
| 5,669,352 | A | 9/1997 | Mitchell | |
| 5,839,419 | A | 11/1998 | Hawley | |
| 5,947,085 | A * | 9/1999 | Deal | 123/389 |
| 6,189,505 | B1 | 2/2001 | Reid | |
| 6,595,175 | B1 * | 7/2003 | Capoferi et al. | 123/184.46 |
| 7,487,758 | B1 | 2/2009 | Reid | |
| 7,497,772 | B2 | 3/2009 | Laib | |
| 2006/0090722 | A1 * | 5/2006 | Boveia | 123/184.21 |
| 2008/0135009 | A1 * | 6/2008 | Wilson | 123/184.46 |

FOREIGN PATENT DOCUMENTS

GB 1392048 4/1975

OTHER PUBLICATIONS

Bonsor & Nice, How NASCAR Safety Works, How Stuff Works.com, Feb. 2001, <http://auto.howstuffworks.com/auto-racing/nascar/nascar-basics/nascar-safety.htm>, US.
Willy'S Carburetor & Dyno Shop, Willy's Adjustable Restrictor Plate, <http://www.willyscarbs.com>, 2010, Mt. Carmel, IL.
Number 1 Stop Products, <http://www.number1stop.com/throttle.html>, 2010, Cedar Falls, IA.

\* cited by examiner

*Primary Examiner* — Lindsay Low
*Assistant Examiner* — Kevin Lathers
(74) *Attorney, Agent, or Firm* — Thomas M. Freiburger (57) ABSTRACT

One embodiment of a device and method for controlling or restricting the air-fuel mixture into an internal combustion engine having a body member rigidly mounted between the air-fuel metering device and the engine intake, a slidably insertable restrictor plate, and a retaining and sealing cover. The body member may contain a single spacer or two spacers and may contain either a slot or a groove that communicates with the plate. The plate may contain a plurality of bore holes and multiple distinct plates can be made in order to achieve various and linear amounts of restriction. The plate can be easily and quickly changed depending on the amount of restriction desired. One or more embodiments of the device can be used on engines in various motorized vehicles and in various motorsports, such as drag racing. Other embodiments are described and shown.

9 Claims, 12 Drawing Sheets

METHOD AND DEVICE FOR CONTROLLING AIR-FUEL INTAKE OF AN INTERNAL COMBUSTION ENGINE

BACKGROUND

Prior Art

A drag race is a race between two vehicles (typically cars or motorcycles) from a standing start to a finish line that is generally a quarter mile away down a straight race track. A drag race is started by a series of yellow lights mounted on a "Christmas Tree" which sequentially count down until a green light appears that starts the race. The cars are timed by an electronic unit that times how long it takes for each car to run the length of the race track from the starting line to the finish line. The amount of time required to traverse the race track is called the "Elapsed Time", or more commonly, the "ET."

In some classes of drag racing, such as "Bracket Racing", "Super Class Racing", and "Index Racing," the driver, the race track officials, or the race sanctioning association selects the ET that the car should run. This is known as the "Dial In" in Bracket Racing or the "Index" in Super Class and Index Racing. The object of a racer is to get to the finish line ahead of his opponent without going quicker than his Dial In/Index. If the racer goes quicker than his Dial In/Index and his opponent does not, or if both racers go quicker than their Dial Ins/Indexes, the racer who goes furthest under the Dial In/Index gets disqualified and his opponent wins the race.

In Bracket Racing, or ET Racing, a slow car can race a fast car by having the racetrack handicap the fast car by permitting the slower car to start the race first. This is done using a Christmas tree that has a series of vertical lights for each car. The Christmas tree lights for the slower car are lighted a selected amount of time before the lights for the faster car. Handicapping allows the slower car to start first by an amount of time that is equal to the difference between the Dial Ins of the two cars (the handicap). In theory, if both cars leave the starting line exactly when their respective green Christmas trees lights turn on, and they run perfectly on their Dial In, they should cross the finish line at the same time.

In Super Class Racing and Index Racing, both cars are assigned the same Index and therefore, both cars leave the starting line at the same time. They race each other and try to finish first without going quicker than the assigned Index. In these types of racing, where the Index is assigned by the track or the race sanctioning body, the race car engines typically produce enough power so that the car can run quicker than the Index under track or weather conditions that cause a car to run slower than normal. A car having more power than required to run its Index can always run too quickly under normal conditions and so it must be slowed down to avoid disqualification for running under its Index.

Devices known as "throttle stops" were created to selectively limit the horsepower of racecar engines to prevent the car from completing the race with an ET that is less than its Dial In. Typically, these throttle stops partially close the throttle with blades or butterflies that partly obstruct the fluid flow passageway or air-fuel intake. Throttle stops are generally expensive and most are typically 51 mm, or more, thick. This can be problematic for many racecars that do not have the available clearance under the hood. Also, most types of throttle stops have an electronic activation assembly or actuator to activate the throttle stop mechanism. Examples of actuators are an electric solenoid, a pneumatic cylinder, or some kind of electrical motor that moves the throttle stop mechanisms, as disclosed by U.S. Pat. Nos. 5,642,712 and 7,487,758, for example. Electronic throttle stops generally restrict the fluid flow of the engine during a portion of the run and not for the entire duration of the run. In Super Class Racing, electronic throttle stops are usually allowed. However, in Index Racing, any type of an electronic power regulator is typically not allowed.

Known non-electronic throttle stops usually limit the horsepower of an engine through manual adjustments of a knob on the device, rather than an electronic actuator. Unlike electronic devices, these devices are not adjustable during the run. If the racer desires more restriction, he applies more turns to the knob prior to the run. Each turn applied to the knob, however, may not equate to the same amount of adjustment in power or ET. When the engine is restricted by a relatively small amount (i.e. the butterflies are more open than closed), a significant number of turns on the knob could be required to obtain slight power adjustments. In contrast, when the engine is restricted by a large amount (i.e. the butterflies are more closed than open), slight adjustments to the knob could result in substantial power adjustments. Therefore, with these devices, it is difficult to accurately and reliably make fine adjustments to the power of the engine. Also, once the amount of restriction has been changed, the user must remember the exact number of turns applied to the knob in order to achieve the desired and/or exact previous amount of restriction at a later date.

Other prior art of devices that limit the horsepower of racecar engines without the use of electronics includes a restrictor plate. This plate generally has a fixed orifice that restricts the flow to the engine and is rigidly mounted between the carburetor and intake manifold of an engine. This system does not allow for a quick change in the adjustment of horsepower because the air filter, carburetor, linkage, fuel lines, etc. have to be removed in order to change the plate or to run the motor without restriction. This is time consuming and also requires the use of several tools.

U.S. Pat. No. 5,947,085 discloses a complex device that contains automatic variable orifices in a restrictor plate. This device comprises several components and is used for achieving parity in several racing vehicles in the same race, such as a NASCAR race. Therefore, this device is not suitable for drag racing vehicles.

Other known non-electronic prior art includes a device that has adjustable sliding mechanisms that open and close like a shutter in several orifices. Once an adjustment is made, the adjustment cannot be locked in place. Additionally, once the amount of restriction has been changed, the user must remember the exact adjustment in order to achieve the same amount of restriction in the future, which can be problematic. Therefore, this device does not provide a consistent and reliable method of restriction. Also, this device was designed for use in circle dirt track racing and is thereby not suitable for drag racing.

Another known method of restricting the flow of an engine without using electronics in drag racing include mounting a bolt or screw behind the accelerator pedal or behind the throttle linkage to limit the opening of the throttle blades on the carburetor. The user changes the amount of restriction by changing the number of turns applied to the bolt. Similar to the non-electronic throttle stops, once the amount of restriction has been changed, the user must remember the exact number of turns applied to the bolt in order to achieve the desired and/or exact previous amount of restriction. This does not provide an accurate, reliable, or consistent method to reduce the horsepower to a desired and predetermined amount.

ADVANTAGES

Accordingly, several advantages of one or more aspects are as follows: to provide a device for restricting the horsepower of an internal combustion engine that consists of a small number of stationary components, is relatively inexpensive, and provides consistent and accurate restriction to drag race vehicles that race in categories where electronic devices are not allowed. Other advantages are to provide a reliable and linear change in ET for drag race vehicles, as well as a method for an easy and quick change of the amount of restriction desired. These and other advantages of one or more aspects will be apparent from a consideration of the accompanying drawings and ensuing description.

SUMMARY

In accordance with one embodiment, a restrictor device and method for controlling the air-fuel mixture drawn by an internal combustion engine, in which the device is rigidly mounted between the air-fuel metering device and the intake manifold of the engine. The device comprises a main body member, a slideably insertable restrictor plate, and a retaining/sealing cover. Several distinct plates can be made and the plate can be quickly and easily changed in order to change the amount of restriction desired. The device and method of one or more aspects can be applied to almost any motorized vehicle, especially one having an internal combustion engine, and to any motorized vehicle participating in motorsports, including, but not limited to, drag racing.

DRAWINGS

Figures

In the drawings, closely related figures have the same number but different alphabetic suffixes.

FIGS. 4A and 4B, and 4C show representations of the device in accordance with another embodiment, where FIGS. 4A and 4B are perspective and top views, respectively, of the main body member of the device and FIG. 4C is a top view of the partially assembled device.

FIGS. 6A to 6C show views in accordance with another embodiment of the device where FIG. 6A is an exploded assembly view, FIG. 6B is an enlarged side view of the cover of the device, and FIG. 6C is a perspective view of the assembled device.

DRAWINGS

Reference Numerals

10—air filter
12—carburetor
14—restrictor device
16—engine intake manifold
18—spacer
18a—spacer
20—spacer bolt hole
22—corner of spacer
24—spacer bolt
26—orifice of spacer
27—portion of side 28a
28a—exterior side of spacer
28a'—exterior side of spacer 18a
28b—exterior side of spacer
30a—right angle of side 28a of spacer
30b—right angle of side 28a of spacer
32—slot in spacer
32a—interior corner of slot 32
34a—interior side of spacer
34b—interior side of spacer
34c—interior side of spacer
36—spacer stud hole
36a—spacer stud hole in spacer 18a
38—stud
40—restrictor plate
40a—restrictor plate
41—corner of restrictor plate 40
41a—corner of restrictor plate 40a
42a—upper planar surface of restrictor plate
42b—lower planar surface of restrictor plate
44a—peripheral edge of restrictor plate
44b—peripheral edge of restrictor plate
44c—peripheral edge of restrictor plate
44d—peripheral edge of restrictor plate
46—restrictor plate bore hole
48—retaining/sealing cover
50—sealing rubber
52—retaining plate
54—side of rubber
56—side of retaining plate
58—stud hole in retaining/sealing cover
60—magnet
62—nut
64—tab
64a—tab of restrictor plate 40a
66—orifice of restrictor plate 40a
68—spacer notch
70—spacer spring hole
72—spring
74—plug
76—slot in rubber
78—planar surface of spacer
80—groove
82—interior corner of groove 80

DETAILED DESCRIPTION

Figure 1:
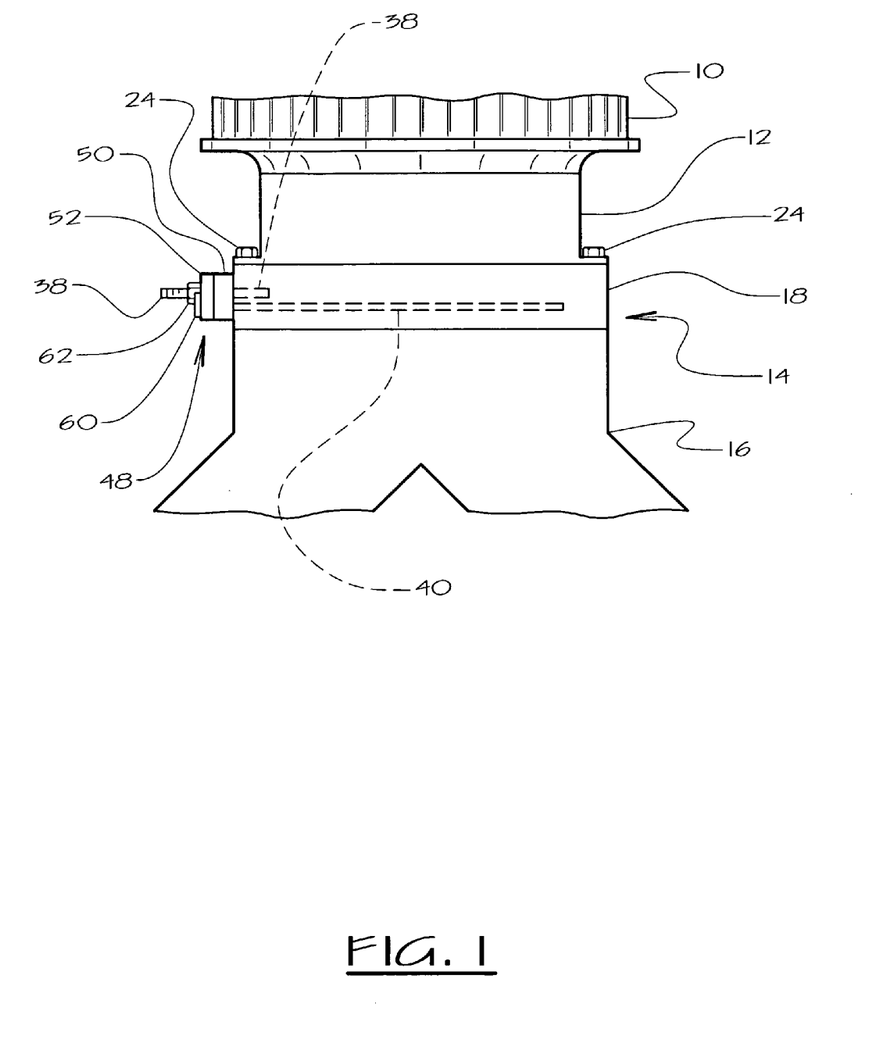
FIG. 1 shows a side view of the device in relation to a carburetor and intake area of an engine.
Figure 2A:
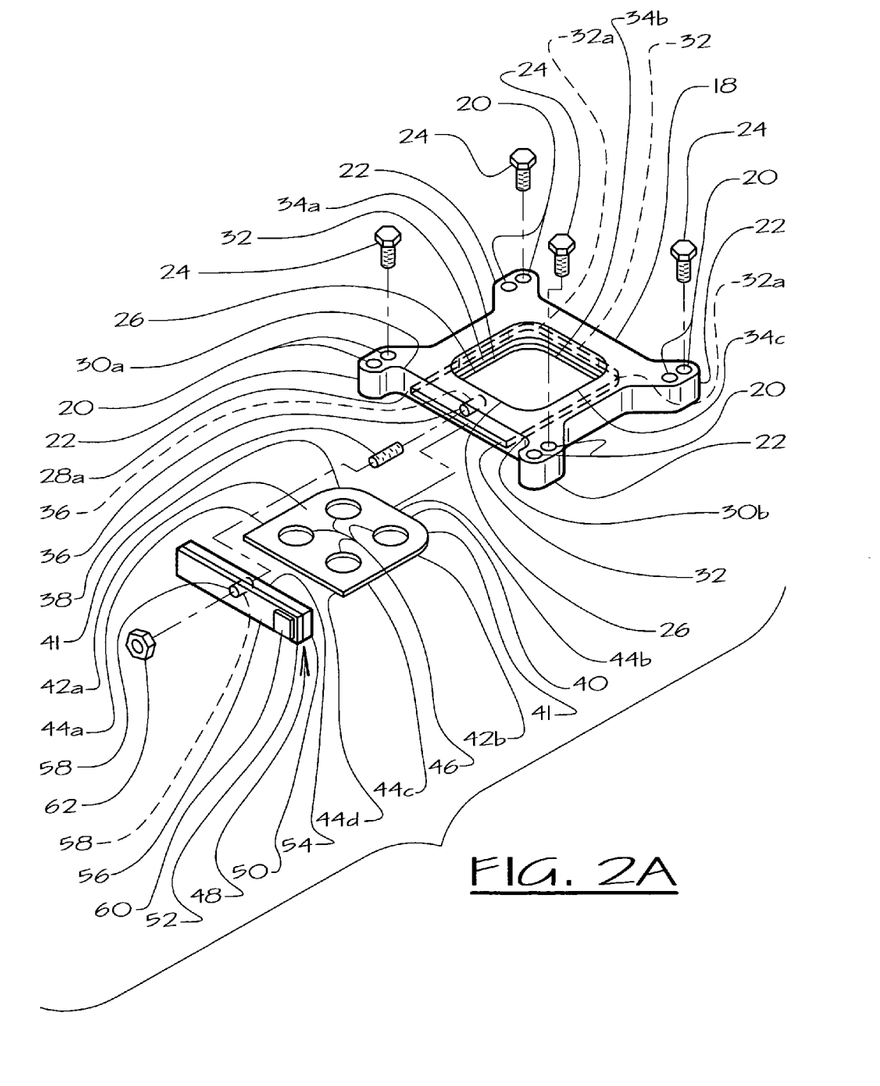
FIG. 2A shows an exploded assembly view of the device in accordance with a first embodiment.
Figure 2B:
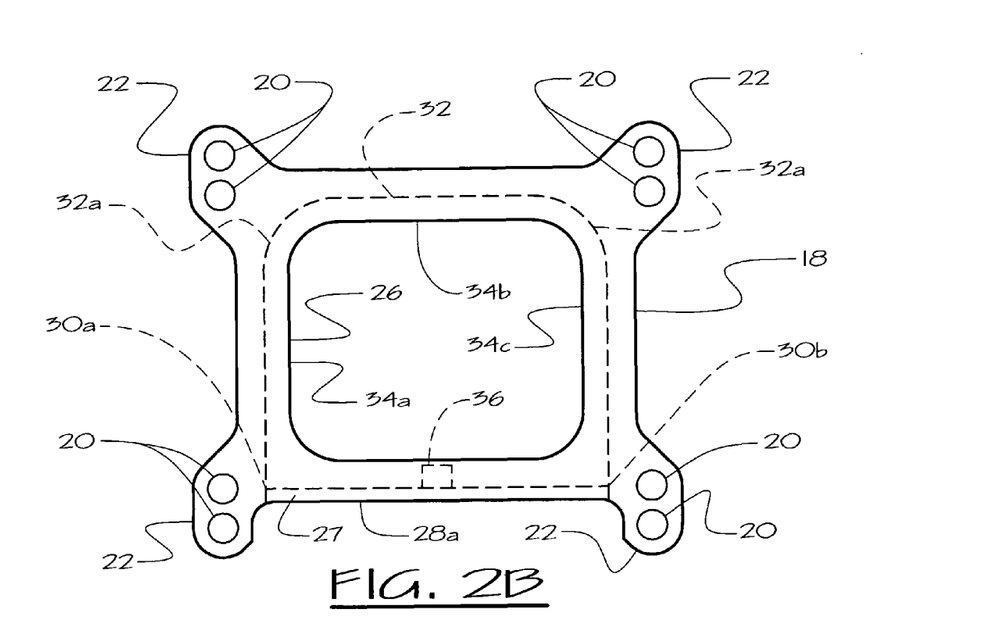
FIG. 2B shows a top view of the main body member of the device in accordance with a first embodiment.

FIGS. 1, 2A, 2B

First Embodiment

An engine (not shown) of a car requires or demands an air-fuel mixture for combustion. Referring to FIG. 1, the engine typically contains an air filter 10, an air-fuel metering device, such as a carburetor 12, and an engine intake manifold 16. According to one embodiment, a restrictor device 14 is rigidly mounted between carburetor 12 and intake 16.

FIG. 2A shows an exploded assembly view of the device according to one embodiment. A universal spacing block or standard spacer 18 is used as the main body member of the device. Alternatively, spacer 18 could also be cut, formed, cast, extruded, etc. from aluminum or another suitable material. Spacer 18 is typically equipped with a plurality of bolt holes 20 that extend through corners 22. Bolt holes 20 correspond to a plurality of bolts 24. Spacer 18 is also generally supplied with two gaskets (not shown). I presently contemplate that spacer 18 be approximately 25.4 mm thick, but various thicknesses can be used. FIG. 2A shows spacer 18 having a central generally square but slightly trapezoidal orifice 26. However, spacers that have multiple orifices (not shown), such as four central holes, etc. could also be used. I also presently contemplate that spacer 18 be made of aluminum, but it can be made of different materials, such as steel, phenolic, wood, plastic, etc.

Figure 2C:
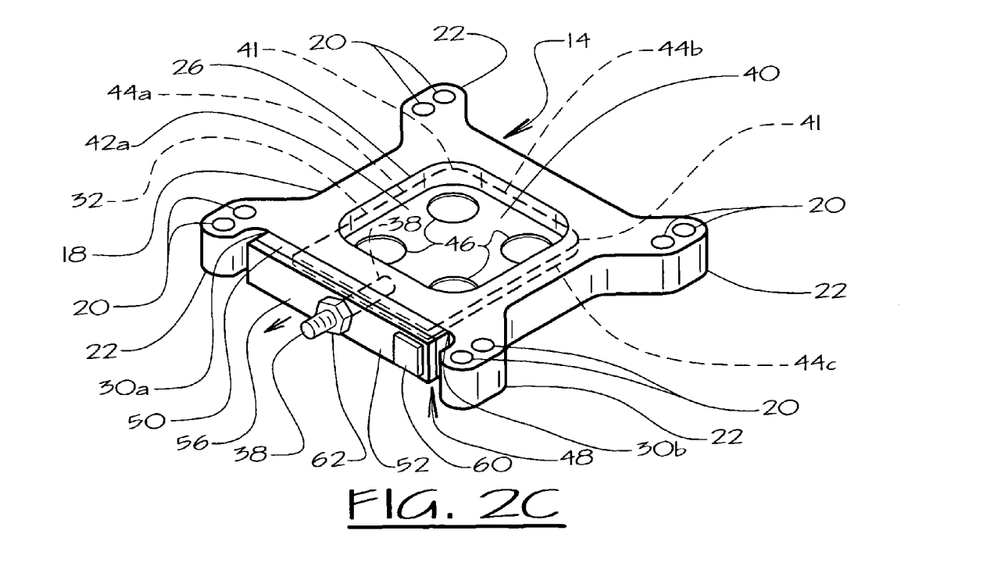
FIG. 2C shows a perspective view of the assembled device in accordance with a first embodiment.

The spacer shown in FIGS. 2A, 2B, and 2C and subsequent embodiments is that which is typically used for any model or brand of carburetor that utilizes a 4150 or 4160 style baseplate. One skilled in the art will appreciate that other types of spacers (not shown) for other various models or brands of carburetors could also be utilized, albeit the shape of the spacer may vary slightly from that of spacer 18.

Referring to FIG. 2B, a small portion 27 of an exterior side 28*a* of spacer 18 is cut or machined uniformly so that right angles 30*a*, 30*b* are cut into side 28*a* of spacer 18. FIG. 2B is a top view of spacer 18 and shows the portion of side 28*a* that is cut out. One skilled in the art will appreciate that if spacer 18 is made (cut, formed, cast, extruded, etc.) rather than obtaining the universal spacer, then portion 27 would be cut when the spacer is made. One skilled in the art will also appreciate that the removal of portion 27 may not be necessary for other types of spacers (not shown) for other types of carburetors.

As shown in FIGS. 2A and 2B, a slot 32 is cut into interior sides 34*a*, 34*b*, 34*c* and through side 28*a* of spacer 18. I presently contemplate that slot 32 be approximately 2.3 mm thick and located approximately 5.1 mm from the bottom of side 28*a*, but it can have various thicknesses and be located at various dimensions from the bottom of side 28*a*. Slot 32 is cut so that it is no wider than the width of bolt holes 20. In other words, slot 32 does not come into contact with bolt holes 20. I also presently contemplate that interior corners 32*a* of slot 32 be radial. The radial dimension or shape (i.e. perpendicular rather than radial) of corners 32*a* can vary as long as slot 32 does not penetrate any exterior side of spacer 18, except for side 28*a*. A blind hole 36 is drilled and tapped into side 28*a* of spacer 18 above slot 32. Hole 36 is horizontally located approximately in the center of side 28*a*.

Referring to FIG. 2A, a threadlocker (not shown) is then applied to a threaded headless bolt or stud 38 that has a diameter and thread size that corresponds to hole 36. I presently contemplate that stud 38 be approximately 6.3 mm in diameter and have a coarse thread pattern. However, various diameters and thread patterns can be used, as long as stud 38 conforms to hole 36. Stud 38 is then permanently affixed in hole 36 of spacer 18 as shown in FIG. 2A. I presently contemplate that stud 38 is approximately 25-32 mm in length, but various lengths can be used. One skilled in the art will appreciate that spacer 18 could be further modified by adding one or more blind holes and studs to side 28*a*.

Referring to FIG. 2A, a restrictor plate 40 is cut so that it has two radial corners 41 and planar upper and lower surfaces 42*a*, 42*b*. Thus, the perimeter of plate 40 or peripheral edges 44*a*-44*d* and thickness of plate 40 fit into slot 32 cut into spacer 18. I presently contemplate that corners 41 of plate 40 have a radial dimension of approximately 33 mm; however, other dimensions or shapes could be used, as long as plate 40 substantially conforms to slot 32. I also presently contemplate that plate 40 be cut from steel, but it can be made of any suitable rigid, fuel resistant material. One or more bore holes 46 are cut into plate 40. Four bore holes appear in FIGS. 2A and 2C to illustrate the concept, however, different sizes, shapes, and number of bore holes can be cut into plate 40. Multiple plates can be made and the size, shape, and number of bore holes 46 can vary with each distinct plate. The plates are generally made so that the total cross sectional area of the bore holes is less than that of the outlet of the carburetor. Plate 40 can be marked or stamped on planar surfaces 42*a*, 42*b* allowing for easy identification. Plate 40 is then coated with a corrosion resistant material, such as zinc, nickel, cadmium, chrome, etc.

FIG. 2A shows a retaining and sealing cover 48 that is made from bonding a piece of rubber 50 to a retaining plate 52 via a bonding agent. The perimeters of rubber 50 and retaining plate 52 correspond to the rectangular portion and right angles 30*a*, 30*b* of side 28*a* of spacer 18. I presently contemplate that retaining plate 52 be made of steel, but it could be made of any suitable rigid material. Thus, units 50 and 52 constitute an apparatus for securing and sealing plate 40 in spacer 18. Once assembled, cover 48 has an exposed side 54 of rubber 50 and an exposed side 56 of retaining plate 52. A hole 58 that corresponds to the size and location of stud 38 in spacer 18 is drilled through cover 48. A magnet 60 is attached to side 56 of retaining plate 52 with an adhesive or bonding agent.

FIGS. 1, 2A, and 2C also show a nut 62, which is another component of device 14. Nut 62 has an inside diameter and thread size corresponding to stud 38.

Operation—FIGS. 1, 2A, 2C

In operation, device 14 adjusts, varies, or restricts the air-fuel or fluid flow available for an engine. As shown in FIG. 1, spacer 18 is rigidly mounted between carburetor 12 and intake 16 by placing bolts 24 through the carburetor, through spacer bolt holes 20, and into the intake. As is typical when using spacers on engines, the upper gasket (not shown) is placed between the spacer and the carburetor and the lower gasket (not shown) is placed between the spacer and the intake manifold. Usually, one bolt 24 is placed through each corner 22 of spacer 18. FIG. 2A shows spacer 18 having two bolt holes 20 in each corner 22, for a total of eight bolt holes 20. This is so that the spacer can be mounted to various types of intake manifolds. Therefore, once spacer 18 is mounted, four bolt holes 20 (one in each corner 22) are usually not used. One skilled in the art will appreciate that other spacers could be used that have one bolt hole in each corner, rather than two (not shown).

Alternatively, studs (not shown) can be screwed into the intake and used to mount the spacer and the carburetor to the intake instead of bolts 24. When studs are used, the carburetor and the spacer are mounted over the studs and secured to the intake by placing a nut (not shown) on each stud. Once spacer 18 is mounted, air filter 10 is typically placed over carburetor 12, as shown in FIG. 1.

Restrictor plates with varying bore holes can be made so that there is a linear progression of ET change with each plate. Thus, once spacer 18 is mounted, the user then determines the amount of restriction desired for the engine and accordingly selects the desired restrictor plate. Plate 40 is inserted into spacer 18 via slot 32 in side 28*a* of spacer 18. After inserting plate 40 into spacer 18, cover 48 is then attached to spacer 18 by aligning hole 58 over stud 38 and then pressing cover 48 to spacer 18 so that exposed side 54 of rubber 50 is adjacent to side 28*a* and slot 32. As shown in FIGS. 2A and 2C, nut 62 is then placed on stud 38 and tightened with a nut driver or open end wrench, box end wrench, socket wrench, etc. (not shown). Cover 48 holds plate 40 in place after being inserted into spacer 18, as shown in FIGS. 1 and 2C. Cover 48 also seals the device to prevent any additional air from entering the engine via slot 32. Once cover 48 is secured on the device, the racer can then make a pass down the drag strip. The device allows for a consistent amount of restriction during the entire pass and does not interfere with the carburetor throttle operation.

After making a pass down the drag strip, the racer can quickly and easily change the plate if more or less restriction is needed in order to run the desired index or ET. To change the amount of restriction, nut 62 is removed from stud 38 and cover 48 is removed. The user then holds cover 48 up to plate 40, which is in slot 32 of spacer 18, so that magnet 60 on cover 48 is adjacent to edge 44*d* of plate 40. The user then pulls plate 40 out of spacer 18 by the magnetic force applied by magnet 60 on plate 40. Once plate 40 is removed, another plate (not shown), which is dissimilar to plate 40 (i.e. larger or smaller diameter bore holes, more or less number of bore holes, etc.), is inserted back into spacer 18 via slot 32. Cover 48 is placed over stud 38 and nut 62 is placed on stud 38 and tightened. This method allows for the amount of restriction on the engine to be changed quickly and easily. Fewer tools are utilized and less work is involved because the air filter, carburetor, linkage, fuel lines, and spacer remain in place on the engine. Thus, as compared to the time it would take to remove the air filter, carburetor, linkage, fuel lines, and spacer (several minutes), the plates can typically be changed in a relatively short amount of time (20-30 seconds).

The user could also easily run two different classes in the same race by utilizing one restrictor plate corresponding to a first index and another restrictor plate corresponding to a second index. At future races, he can simply select the plate that corresponds to the desired index.

Should a user wish to run the engine with no restriction, she can also use the device with no plate inserted in spacer 18, as long as cover 48 is placed on the device to prevent any additional air from entering the engine via slot 32.

If desired, the user can also run the engine with additional items (not shown) mounted above or below the device, such as additional spacers, nitrous oxide plates, etc.

At present, I believe that this embodiment utilizes a more efficient manufacturing process, but the other embodiments are also satisfactory.

Alternative Embodiments

Several alternative embodiments of the device and its parts will now be discussed.

Figure 3A:
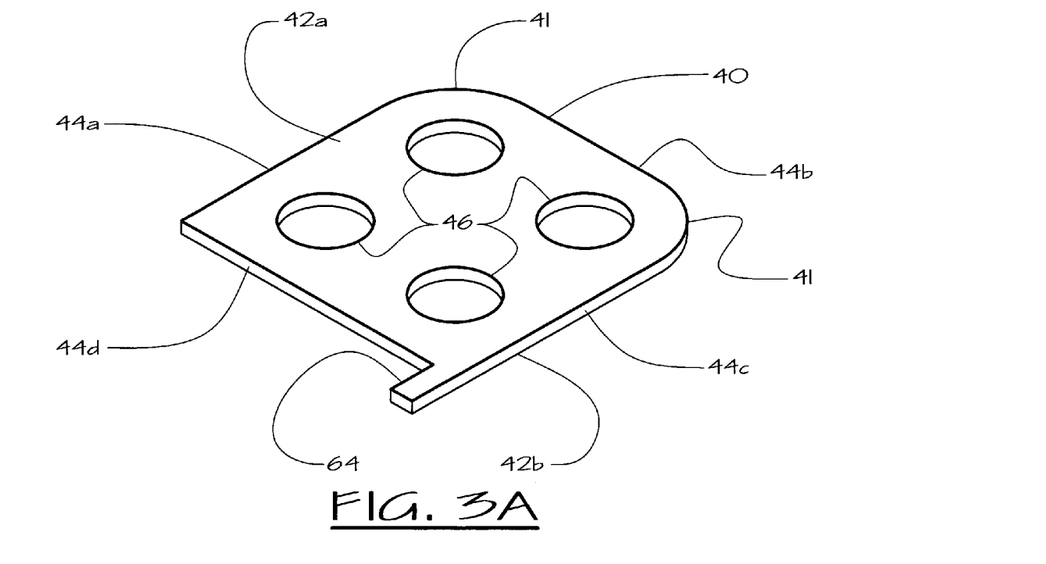
FIGS. 3A and 3B show perspective views of alternative restrictor plates in accordance with another embodiment.
Figure 3B:
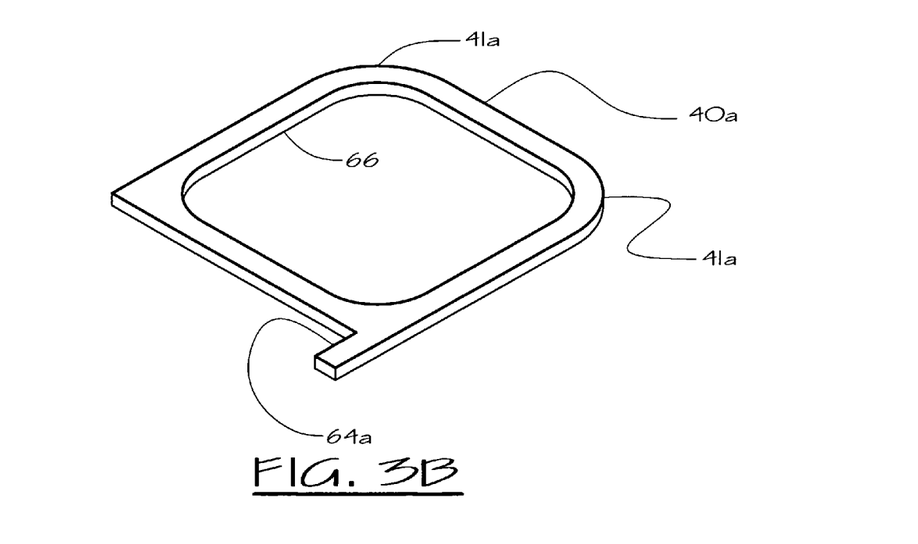

FIGS. 3A and 3B

Additional Embodiment

Tab Version

FIG. 3A shows a perspective view of an alternative embodiment in which plate 40 has been cut to include a tab 64 protruding from edge 44*d*. Cover 48 (not shown) is then altered (shortened, rubber notched out, etc.) in order to allow for protruding tab 64. One skilled in the art will appreciate that the location of the tab along edge 44*d* and associated alteration of cover 48 (not shown) can be varied without detracting from the present embodiment.

In addition to the plates that are generally made so that the total cross sectional area of the bore holes is less than that of the outlet of the carburetor, FIG. 3B shows an additional plate 40*a* that is made. Plate 40*a* has a single orifice 66 that corresponds to the orifice of the spacer (not shown). Plate 40*a* also has a tab 64*a* and two radial corners 41*a*.

Operation of Tab Version—FIGS. 3A, 3B

Referring to FIG. 3A, the user can grasp tab 64 to insert plate 40 into the spacer (not shown). When the user wishes to remove plate 40 from the spacer, cover 48 (not shown) is removed and the user can easily pull out plate 40 by grasping tab 64.

Referring to FIG. 3B, due to cover 48 (not shown) being altered to accommodate tab 64, if the user wishes to run the engine with no restriction and prevent any additional air from entering the engine via slot 32 (not shown), plate 40*a* is inserted into the spacer (not shown). The cover is then secured on the spacer.

Figure 4A:
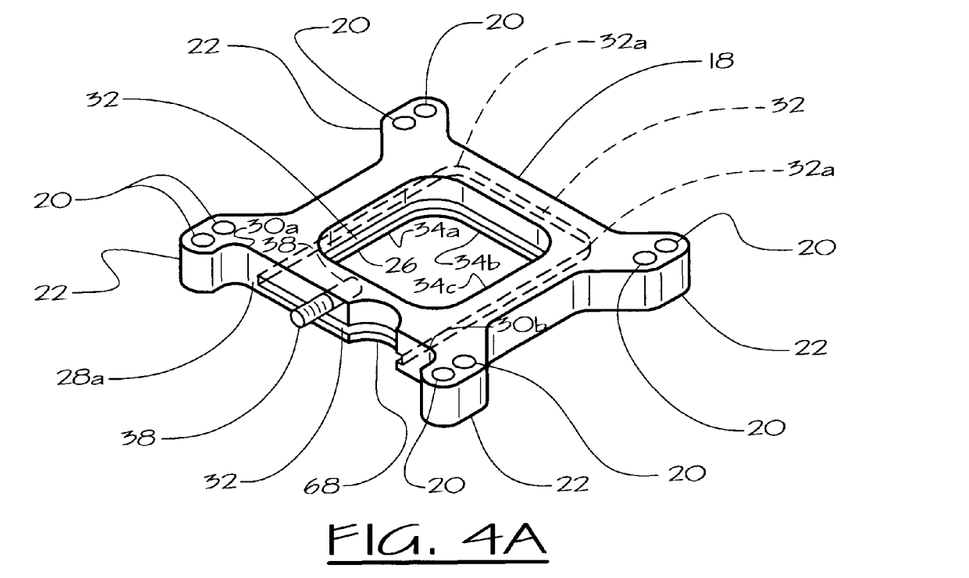
Figure 4B:
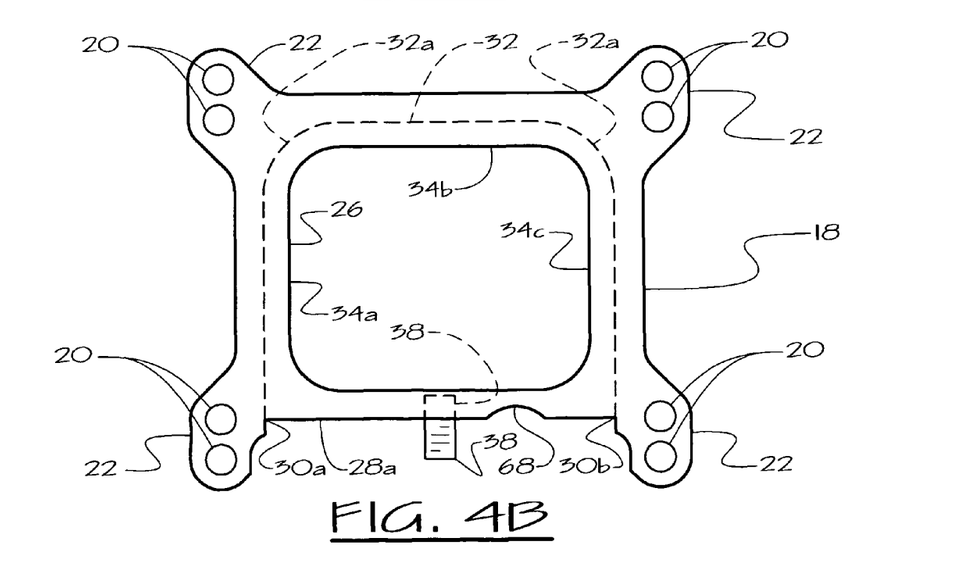

FIGS. 4A and 4B

Additional Embodiment

Spacer Notch Version

FIG. 4A shows an enlarged perspective view of another embodiment in which spacer 18 is further modified by cutting a notch 68 from a portion of side 28*a* of spacer 18. FIG. 4B shows a top view of spacer 18 with notch 68. One skilled in the art will appreciate that the size of the notch can vary and the location of the notch can be anywhere along side 28*a* without detracting from the present embodiment. Cover 48 (not shown) need not be altered.

Figure 4C:
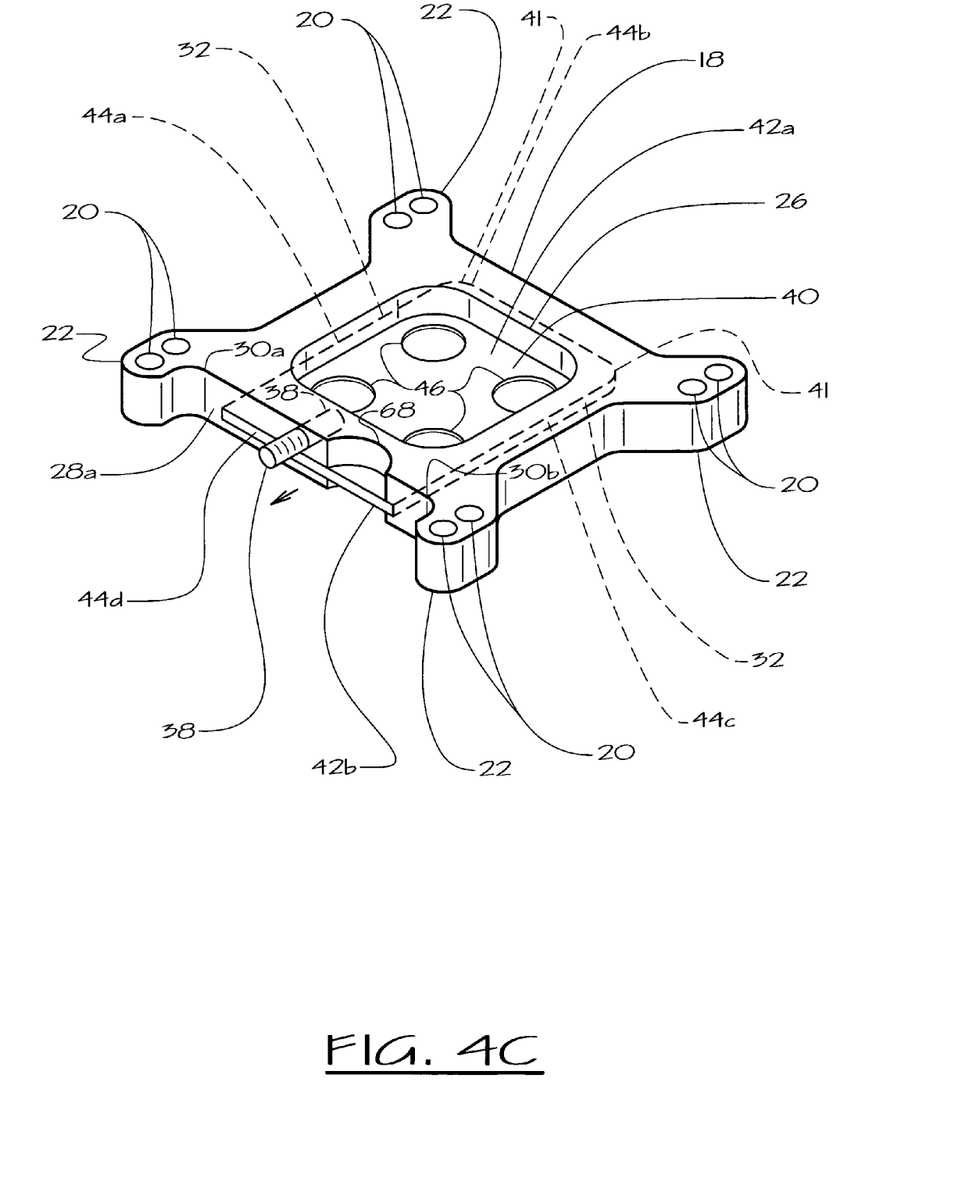

Operation of Spacer Notch Version—FIG. 4C

Referring to FIG. 4C, when the user removes the cover (not shown) in order to remove plate 40 from spacer 18, a portion of planar surfaces 42*a*, 42*b* and edge 44*d* of plate 40 are exposed along notch 68 of side 28*a* of spacer 18. The user can then grasp plate 40 at notch 68 and remove it from spacer 18.

Although spacer 18 has notch 68, cover 48 remains unaltered because once the device is mounted on the engine (not shown), it is sealed above by the carburetor (not shown) and below by the intake (not shown). The slot remains sealed by cover 48.

Figure 5A:
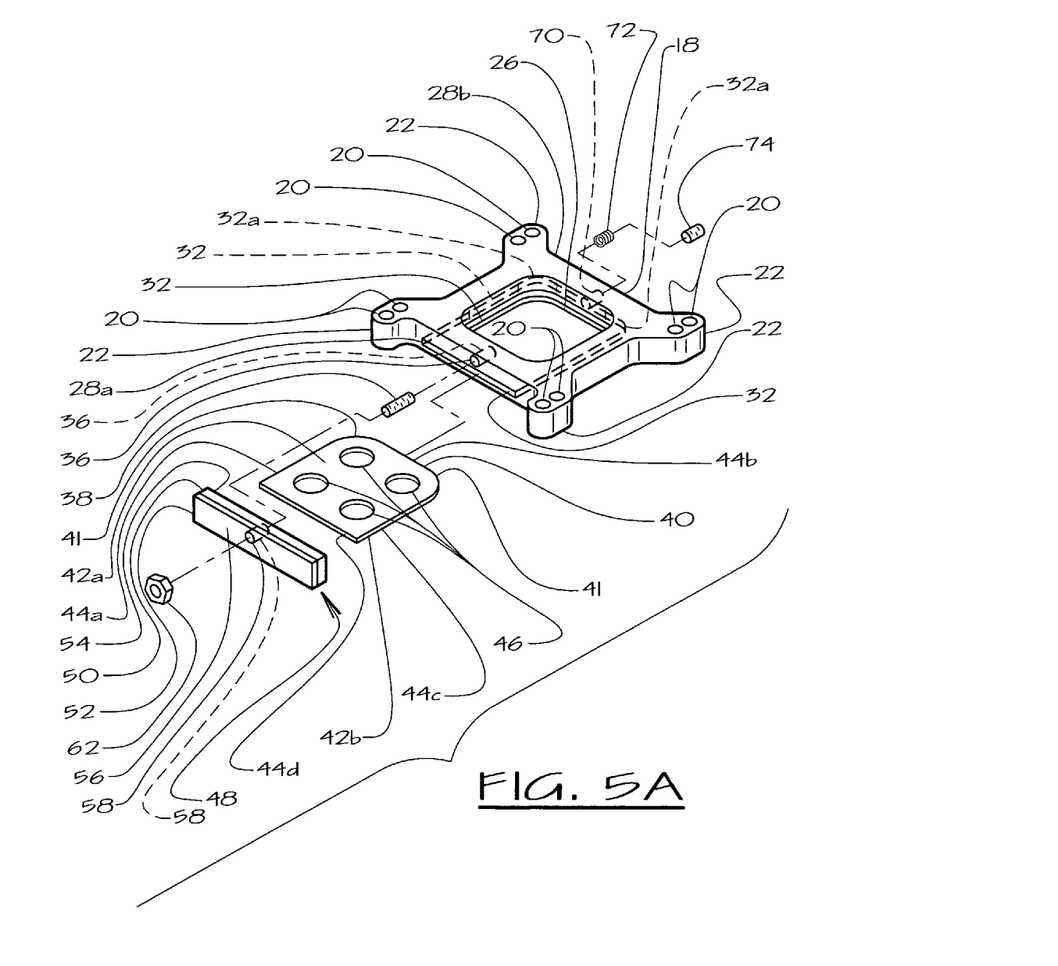
FIGS. 5A and 5B show an exploded assembly view and a perspective view, respectively, of the device in accordance with another embodiment.
Figure 5B:
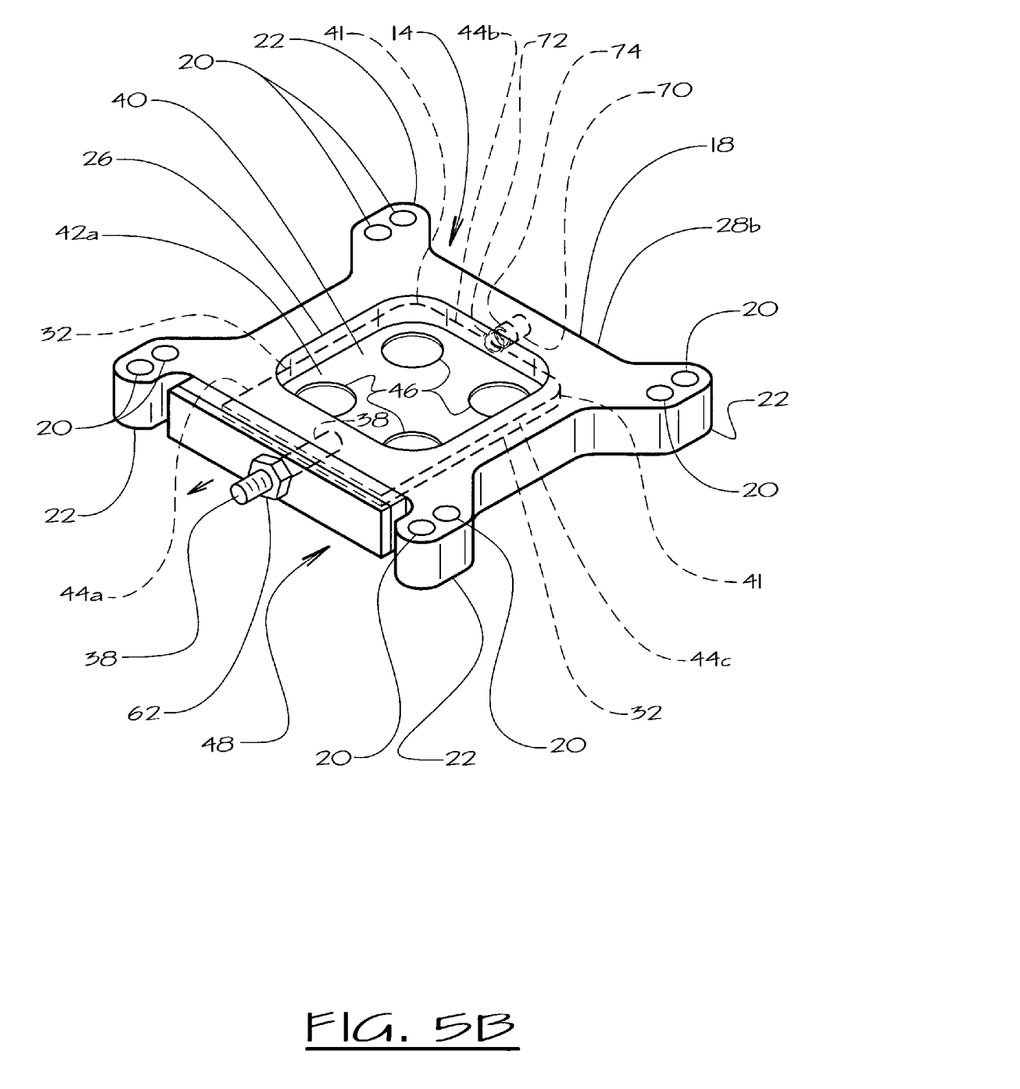

FIGS. 5A and 5B

Additional Embodiment

Spring Version

FIG. 5A shows an exploded assembly view of another embodiment in which an additional small hole 70 is drilled into an exterior side 28*b* of spacer 18, which is opposite side 28*a* that contains hole 36. Hole 70 is drilled into side 28*b* until it slightly enters slot 32. I presently contemplate that the diameter of hole 70 be equal to that of hole 36, but larger diameters could be utilized. A spring 72 of predetermined size is then placed in hole 70. The size of spring 72 corresponds to the size of hole 70. Spring 72 is held in place by a plug 74 made of suitable rigid material that is permanently inserted in hole 70. The size of plug 74 also corresponds to the size of hole 70. I presently contemplate that plug 74 is pressed into hole 70, but it can be permanently inserted by various methods, such as adhesives, welding, pinning, threading, etc. I also presently contemplate that spring 72 and plug 74 be made of steel, but they can also be made of other suitable materials. FIG. 5B shows a perspective view of the assembled device in accordance with the present embodiment.

Operation of Spring Version—FIG. 5B

As shown in FIG. 5B, when plate 40 is inserted into spacer 18 and cover 48 is placed and secured on spacer 18, plate 40 touches and slightly compresses spring 72. When the user removes cover 48, the force of spring 72 pushes plate 40 out beyond edge 28a of spacer 18 and the user can then easily grab plate 40 and remove it from spacer 18.

Figure 6A:
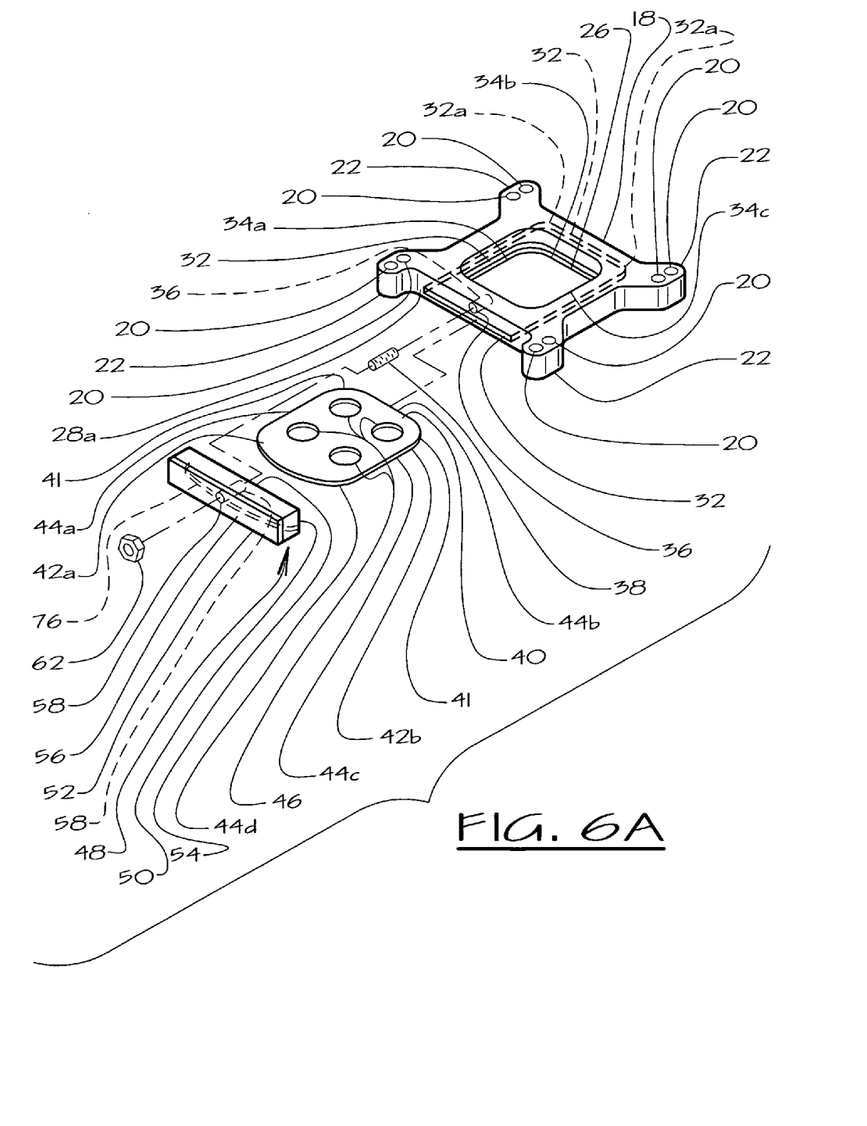
Figure 6B:
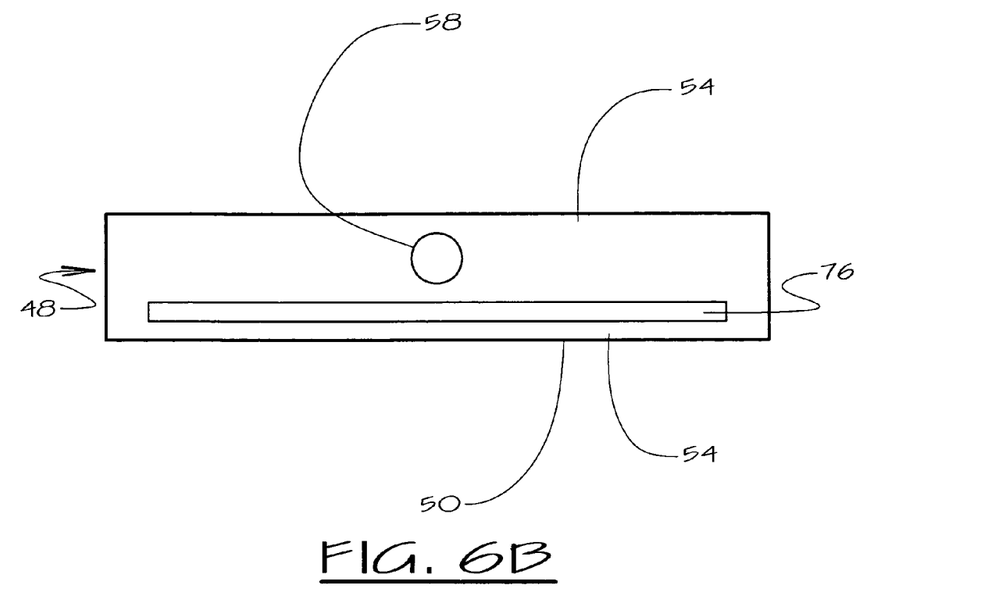

FIGS. 6A and 6B

Additional Embodiment

Alternative Plate Shape

FIG. 6A shows an exploded assembly view of an additional embodiment in which edge 44d of plate 40 has an alternative shape. FIG. 6B shows a side view of cover 48 in which a slot 76 is cut into side 54 of rubber 50 that corresponds to protruding edge 44d of plate 40. I presently contemplate that protruding edge 44d be the shape of an arc (FIG. 6A), but any protruding shape could be used.

Figure 6C:
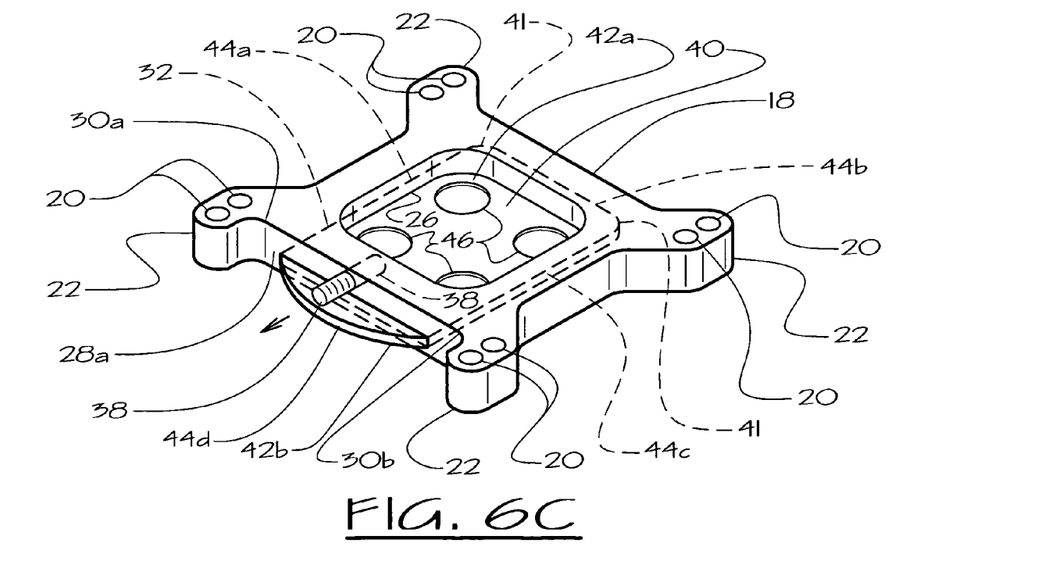

Operation of Alternative Plate Shape—FIG. 6C

Referring to FIG. 6C, the user can grasp edge 44d and surfaces 42a, 42b to insert plate 40 into spacer 18. When plate 40 is inserted into spacer 18, a substantial portion of edge 44d and planar surfaces 42a, 42b protrude from edge 28a of the spacer. FIG. 6C shows the portion of plate 40 protruding from edge 28a when inserted in spacer 18. When the user wishes to remove plate 40 from spacer 18, cover 48 (not shown) is removed and the user can easily remove plate 40 from spacer 18 by grasping protruding edge 44d and surfaces 42a, 42b.

Figure 7A:
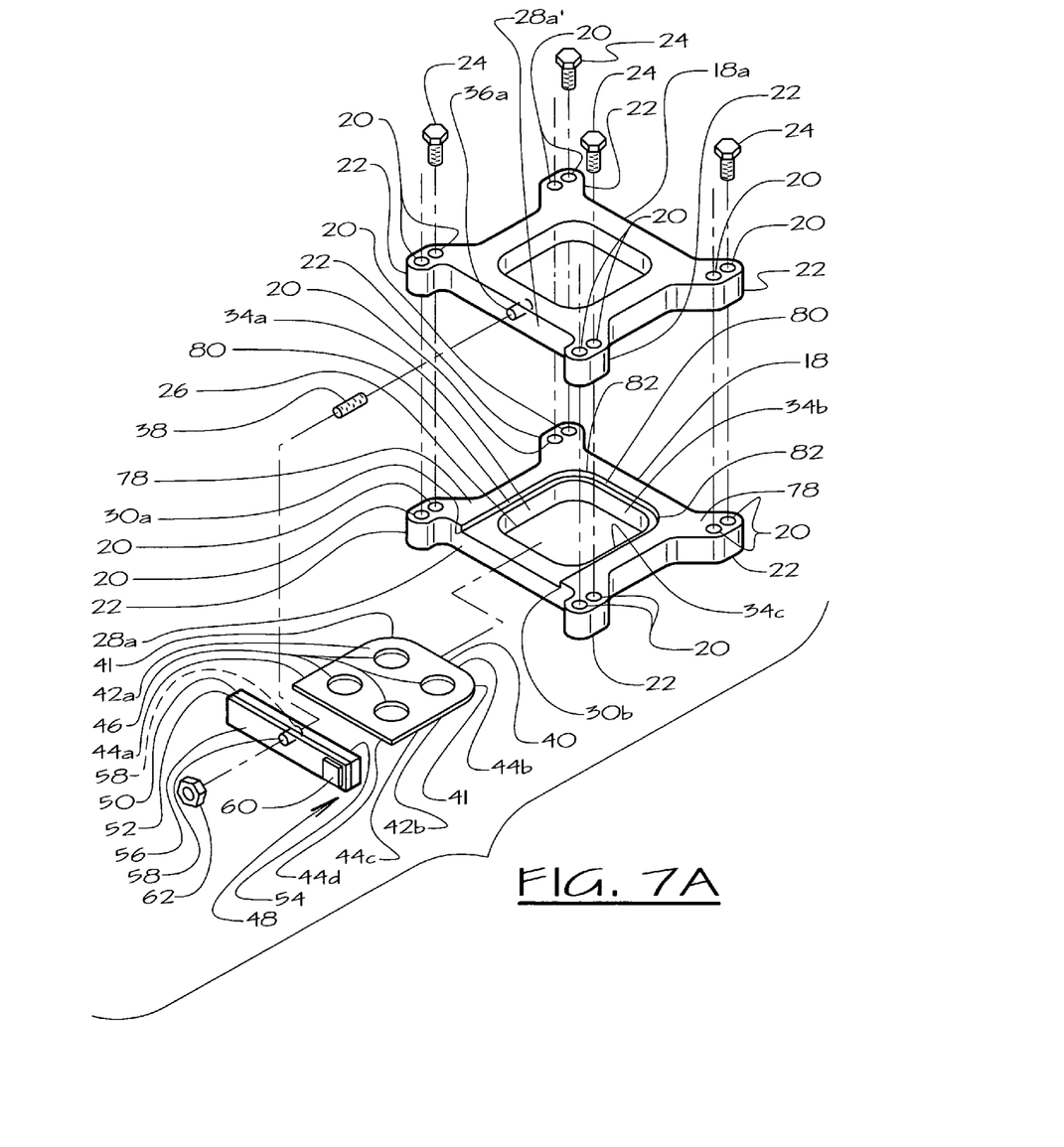
FIGS. 7A and 7B show an exploded assembly view and a side view, respectively, of the device in accordance with another embodiment.

FIG. 7A

Additional Embodiment

Two Spacers

FIG. 7A shows an exploded assembly view according to another embodiment in which an additional spacer 18a is used in conjunction with spacer 18 as the main body member of the device. Similar to spacer 18, spacer 18a can be of various materials and thicknesses. Instead of drilling the hole into spacer 18, a blind hole 36a is drilled and tapped into side 28a' of spacer 18a, as shown in FIG. 7A. Hole 36a is located approximately in the center of side 28a' both vertically and horizontally. The size and thread pattern of hole 36a corresponds to the size and thread pattern of stud 38. A threadlocker (not shown) is applied to stud 38 and stud 38 is permanently affixed in hole 36a of spacer 18a.

Instead of a slot, a portion of a planar surface 78 along sides 34a, 34b, 34c of spacer 18 is cut out or machined uniformly to make a groove 80, as shown in FIG. 7A. Groove 80 has a thickness and shape that corresponds to plate 40. Groove 80 has two radial interior corners 82 and intersects right angles 30a, 30b of side 28a of spacer 18. Corners 82 have radial dimensions such that plate 40 substantially fits into groove 80.

Figure 7B:
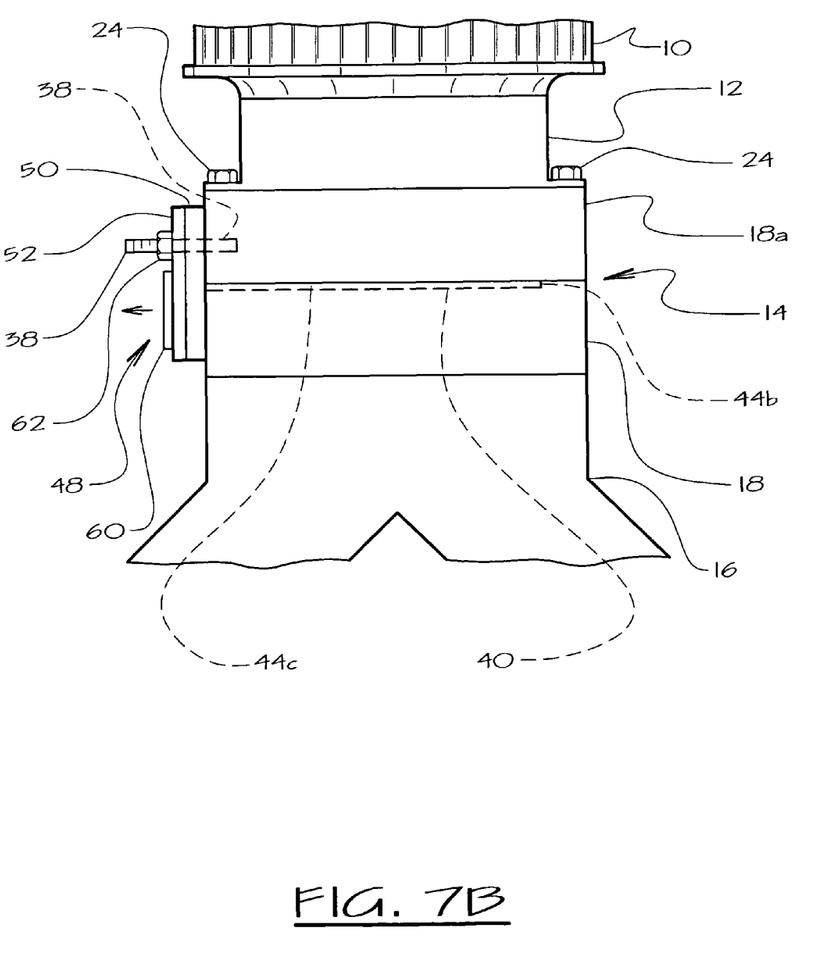

Operation of Two Spacers—FIG. 7B

FIG. 7B shows spacers 18, 18a rigidly mounted between carburetor 12 and intake 16 by bolts 24. In addition to the gaskets (not shown) usually placed between device 14 and carburetor 12 and intake 16, an additional gasket (not shown) is placed between spacers 18 and 18a. Once spacers 18, 18a are mounted, plate 40 is inserted into the device via groove 80. Cover 48 is then placed on device 14 over stud 38 and nut 62 is placed on stud 38 and tightened.

Advantages

From the description above, a number of advantages of some embodiments of my restrictor device become evident:

(a) The device consists of minimal, generally readily available, and stationary components, thereby making for an economical and simple manufacturing process.

(b) This device and method allows for a drag racer to reliably and consistently slow his car down in order to run a specific dial in or index in a category where electronics are not allowed.

(c) The device is relatively less expensive than other restriction devices.

(d) The device, through the use of multiple distinct plates, allows for a linear progression of ET change. This allows a drag racer to accurately and reliably slow her car down as needed to achieve the desired ET or index, thereby enabling her to be more competitive in Index Racing.

(e) Using this device and method, a drag racer could alter his ET in order to race in several different classes in the same race. For example, the racer could have the opportunity to run under maximum power (without restriction) in one ET class and then insert a plate into the device to slow the car down to run in a slower ET class. Or the racer could run two different index classes, utilizing two distinct plates.

(f) Using this device and method, a drag racer can easily recall which plate was previously used to run a specific ET.

(g) The device provides a quick change method of reducing the air-fuel intake of the engine because the user does not need to spend the time to remove the air filter, carburetor, linkage, fuel lines, or spacer in order to change the amount of restriction desired.

(h) The device provides an easy method of changing the amount of restriction desired because a minimal amount of tools are needed in order to change the restrictor plate.

It is understood that the device and method can be applied to almost any motorized vehicle, especially one having an internal combustion engine, as well as different kinds of vehicles that participate in various motorsports.

CONCLUSION, RAMIFICATIONS, AND SCOPE

Accordingly, the reader will see that at least one embodiment of the restrictor device provides a more consistent and reliable, quicker and easier, yet economical means to reduce the air-fuel intake of an internal combustion engine. Furthermore, the device has the additional advantages in that:

it permits a relatively easy and cost effective manufacturing process;

it provides the racer with a linear, dependable, accurate, and consistent means of reducing horsepower and slowing the car down in order to be more competitive in Index Racing or to be able to run in different classes in the same race;

it permits the user to alter the amount of restriction to the engine easily and quickly without the use of several tools or the need to remove additional parts from the engine.

While the above description contains many specificities, these should not be construed as limitations on the scope of any embodiment, but merely as exemplifications of various embodiments thereof. Many other ramifications and variations are possible within the teachings of the various embodiments. For example, different materials can be used for most of the components; different sizes, shapes, and number of bore holes can be cut into the plate in order to achieve the desired amount of restriction into the engine; the slot in the spacer can be of various thicknesses and be cut into any other side of the spacer; the slot, plate, and cover can be of a shape other than that shown and described in the above description.

Also, some of the various embodiments could be used in conjunction with one or several other embodiments described herein.

Thus, the scope of the embodiments illustrated should be determined by the appended claims and their legal equivalents, rather than by the examples given.

I claim:

1. A device for controlling fluid flow into an internal combustion engine intake, comprising:
   (a) a body member mounted upstream of said intake, said body member having a predetermined fluid passage therethrough and a predetermined slot therein;
   (b) a restrictor plate slidably insertable into said slot of said body member, the restrictor plate being of rigid ferromagnetic material, with a perimeter of said plate of predetermined size to substantially conform to said slot, the restrictor plate having one or more bores of predetermined shapes and sizes;
   (c) a retaining cover connectable to the body member for sealing and retaining the restrictor plate in said body member, the cover having a magnet positioned such that the cover with magnet is used to withdraw the restrictor plate form the slow when desired.

2. The device of claim 1 wherein said body member is mounted between an air-fuel metering device and said engine intake.

3. The device of claim 1 wherein said body member further includes a stud, said stud being permanently mounted in a first side of said body member adjacent to said slot, and the cover having a hole positioned to receive the stud to connect the cover to the body member.

4. The device of claim 1 wherein said body member is a single spacer or a plurality of contiguous spacers.

5. The device of claim 1 wherein cover includes a piece of rubber on one surface to seal against the body member.

6. A device including a set of parts for controlling fluid flow into an engine intake from an air-fuel metering device in a drag racing vehicle, comprising:
   (a) a body member mounted between said air-fuel metering device and said engine intake, said body member having a predetermined fluid orifice therethrough and a predetermined slot therein;
   (b) a series of distinct restrictor plates, each having one or more bore holes of fixed size positioned to intersect the fluid passage in said body member when the restrictor plate is inserted in said slot, and the bore holes of each restrictor plate being sized to restrict air-fuel flow to a different degree, with each restrictor plate defining among the series of restrictor plates a linear progression of elapsed time for the drag racing vehicle to traverse a race track;
   (c) a cover detachably mounted to said body member to retain a selected restrictor plate in the slot of the body member.

7. The device of claim 6 wherein said body member further includes a spring, said spring permanently mounted in the body member positioned to be engaged by the restrictor plate when fully inserted into the slot, to urge the restrictor plate outwardly of the slot so that the plate extends partly out of the slot when the cover is removed.

8. The device of claim 6 wherein said cover comprises a retaining plate attached to a piece of rubber, a magnet attached to an exposed side of said retaining plate, said retaining plate being of rigid ferromagnetic material.

9. A method of controlling the engine performance of a racing vehicle, said vehicle having an engine with an air-fuel metering device and an engine intake downstream of said air-fuel metering device, comprising:
   a) providing a body member mounted between said air-fuel metering device and said engine intake, said body member having a fluid passage therethrough to be in communication with said air-fuel metering device and said engine intake, said body member having a predetermined slot therein;
   b) providing a series of distinct restrictor plates, each having one or more bore holes of fixed size positioned to intersect the fluid passage in said body member when the restrictor plate is inserted in said slot, and the bore holes of each restrictor plate being sized to restrict air-fuel flow to a different degree, wherein each restrictor plate defines among the series of restrictor plates a linear progression of elapsed time for the racing vehicle to traverse a race track;
   c) selecting a first restrictor plate from said series of restrictor plates and inserting the first restrictor plate into said slot of said body member in said vehicle;
   d) adjusting the air-fuel fluid flow in the vehicle by removing said first restrictor plate and inserting a second restrictor plate from said series of restrictor plates into said body member, so as to control said engine performance with a different degree of restriction of air-fuel flow;
   whereby said first and second restrictor plates can be quickly and easily changed.

* * * * *